United States Patent [19]

Talalaj

[11] 4,166,334
[45] Sep. 4, 1979

[54] SELF-SETTING WEEDLESS LURE

[76] Inventor: Richard Talalaj, 5138 Jerome, Skokie, Ill. 60076

[21] Appl. No.: 907,181

[22] Filed: May 18, 1978

[51] Int. Cl.² .............................................. A01K 85/02
[52] U.S. Cl. .................................. 43/35; 43/42.43; 43/43.6
[58] Field of Search .................. 43/15, 16, 34, 35, 37, 43/42.4, 42.41, 42.42, 42.43, 43.2, 43.4

[56] References Cited

U.S. PATENT DOCUMENTS

| | | | |
|---|---|---|---|
| 1,791,083 | 2/1931 | Pike | 43/34 |
| 2,729,013 | 1/1956 | Chandler | 43/35 |
| 2,906,051 | 9/1959 | O'Bryan | 43/35 |
| 3,163,956 | 1/1965 | Krutsch | 43/35 |

*Primary Examiner*—Nicholas P. Godici
*Attorney, Agent, or Firm*—Leydig, Voit, Osann, Mayer & Holt, Ltd.

[57] ABSTRACT

A fish lure having a body with a longitudinally extending plunger reciprocably mounted therein and having provision for connection to a fishing line at its forward end, a hook being mounted on the body. A coil spring is interposed between the rear end of the plunger and the front end of the body for biasing the body into a forwardly telescoped position on the plunger. A latch on the body latches the same in a rearwardly extended position on the plunger accompanied by stressing of the spring. The latch mechanism has a triggering member so arranged that when a fish bites down on the lure the triggering member is actuated freeing the spring to snap the body and hook forwardly on the plunger for setting the hook in the mouth of the fish. In the illustrated embodiment a guard is provided for normally shielding the point of the hook, the guard being coupled to the triggering member so that when the guard is depressed the hook is exposed followed by actuation of the triggering member for setting the hook.

6 Claims, 5 Drawing Figures

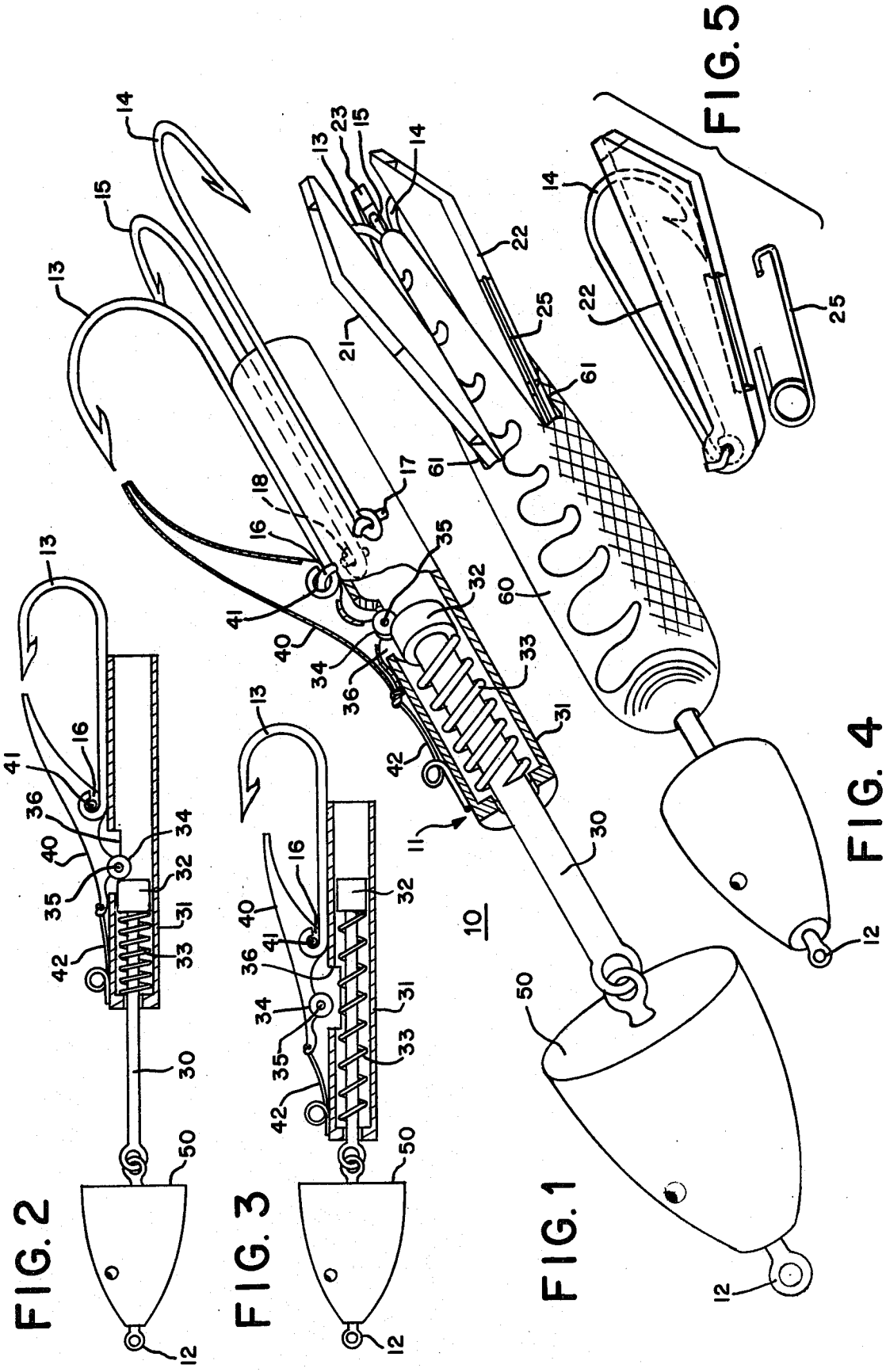

SELF-SETTING WEEDLESS LURE

In Nyvall U.S. Pat. No. 2,010,641 and Petty U.S. Pat. No. 2,690,025 there is shown a fishing lure having a hook which is movable with respect to the body of the lure, the hook being arranged to snap rearwardly as the fish bites down on the lure. A similar mechanism is disclosed in O'Bryan U.S. Pat. No. 2,906,051, with the addition of a small "rebound" spring. The rationale in all three of these patents is that the hook is maintained close to the body in a shielded position until the lure is taken by a fish, with the action of the spring thereafter being to force the hook rearwardly, more deeply into the mouth of the fish.

While such devices have been available to the art for a number of years they constitute no more than a curiosity and their lack of effectiveness is testified to by their scarcity on the open market. My studies indicate that such devices are unsoundly based since they do not act to "set" the hook; indeed, the operation is just the reverse.

It is accordingly an object of the present invention to provide a lure having a hook which is promptly set by snapping forwardly in the hooking direction when taken into the mouth of the fish. More specifically it is an object to provide a lure having a body with an affixed hook and in which the taking of the lure is effective to shift the body forwardly with respect to the line over a distance on the order of an inch, triggered by the biting action of the fish, thereby implanting the hook in the mouth of the fish without requiring timing or, indeed, any action whatsoever on the part of the angler.

It is another object of the present invention to provide a lure which is weedless and in which the hooks are protected by depressible guards, and with the depression of one of the guards being effective to perform the triggering function.

It is a still further object of the present invention to provide a self-setting weedless lure which is simple and economical in construction, foolproof in operation and which is inherently durable and long-lived.

Other objects and advantages of the invention will become apparent upon reading the attached detailed description and upon reference to the drawings in which:

FIG. 1 is a perspective view in partial section of a lure constructed in accordance with the present invention.

FIG. 2 is an elevational view, in section, showing the lure in cocked condition, the showing being somewhat simplified.

FIG. 3 is a view similar to FIG. 2 but showing the lure in triggered condition.

FIG. 4 shows the body of the lure enclosed in a decorative shell.

FIG. 5 is an exploded perspective showing a typical guard and spring.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

Turning now to the drawing there is disclosed a lure 10 (FIG. 1) having a body 11, and eye 12 at its forward end for attachment to a fishing line and presenting three barbed hooks 13, 14, 15 secured at their forward ends at 16, 17 and 18, respectively.

The hooks each have a guard normally shielding the point to prevent snagging of the hooks upon weeds or other obstructions. The guards, indicated at 21, 22, 23, respectively (FIG. 4) are cantilever-mounted on the body, secured at positions 16, 17, 18, respectively, with each of the guards being urged outwardly into its shielding position by means of a spring 25 (FIG. 5), with outward movement being limited, if desired, by suitable stops. The springs 25 are of relatively light construction so that the guards are easily depressed to expose the hooks as a fish bites down upon the lure.

In accordance with the present invention the body of the lure is connected to the eye 12 at the forward end, and to the line, by means of a plunger which telescopes within the body, the plunger and body being interconnected by a spring for biasing the two members into telescoped relation, with a latch mechanism being provided between the plunger and the body for latching the body in a rearwardly extended position accompanied by stressing of the spring. The latch mechanism has a triggering member coupled to one of the guards so that when a fish bites down on the lure depressing the guard, not only is the point of the hook exposed but the latch mechanism is released freeing the spring to snap the body and hook forwardly on the plunger for setting of the hook in the mouth of the fish.

Thus connected to the eye 12, and extending rearwardly from it, is a plunger 30 slidable in a tube 31 which forms part of the lure body. The plunger has a piston 32 at the rear end which is freely slidable within the tube and which serves to hold captive, between the piston and the forward end of the tube, a compression type coil spring 33. Such spring is relatively stiff and has a relatively long stroke so as to bias the plunger into a fully telescoped position within the tube (FIG. 3).

For the purpose of latching the body in a rearwardly extended position with respect to the plunger, accompanied by compression of the spring, a latch mechanism is provided which includes a roller 34 having a pivot 35, the roller being movable through an aperture, or window, 36 in the tube between an inner, or latching, position (FIG. 2) in which the roller is in the path of movement of the piston 32 and an outer position (FIG. 3) in which the roller is clear of the piston. For imparting such movement to the roller the roller is mounted upon a latch triggering member 40 pivoted at 41 and which mounts the roller adjacent its forward end.

For biasing the triggering member into latching position, the front end of the triggering member is engaged by a light spring 42. The triggering member 40 is preferably, although not necessarily, recessed within a guard 21 so that it is rocked to move the roller 34 out of the way of the piston 32, against the restoring force of the spring 42, as the guard 21 is depressed.

In operation the lure is manually "cocked" by pulling the plunger 30 forwardly with respect to the body of the lure as far as it will go thereby compressing the spring 13, which is an energy-storing operation. As the piston 32 at the end of the plunger engages the roller 34, the roller will ride upwardly upon the piston, dropping into blocking, or latching, position behind the piston under the urging of the latch spring 42. To facilitate this cocking movement, the forward edge of the piston may be chamfered or tapering, while the rear end of the piston is abrupt.

The lure is used in the conventional way, that is to say, drawn forwardly through the water at the end of a line at an appropriate depth and rate of speed, depending upon the habits of the fish to be caught. As the lure is taken by the fish the lips of the fish bite down upon the body of the lure depressing the guards including particularly the guard 21 with enclosed triggering member 40 to expose the hooks. Upon rocking of the triggering member 40 the roller 34 at the forward end thereof is moved clear of the piston. Because of the rolling action only a small amount of energy is required to move the latching roller to its triggering position; indeed, as the center of the roller begins to move beyond the edge of the piston, the motion is self-completing by reason of energy stored in the spring 33. Expansion of the spring causes the body of the lure to be suddenly snapped forwardly with respect to the fishing line. Such forward movement of the body and the attached hooks drives the hooks into the mouth tissue of the fish within the lips of the fish. The effect is to set the hooks almost instantaneously before the fish can react by opening its mouth.

The setting action is completely analogous to that which occurs when an angler jerks on his rod to set the hook after getting a strike, but there are a number of significant differences. The first is that the hooks are directly acted upon by energy which is released locally rather than by energy imparted to the rod many yards away and only a small portion of which can be expected to reach the lure.

Moreover, the speed of setting action brought about by the spring 33, occurring instantly, is many times faster than the speed of a hook which is manually set. Also the setting action is self-timed so that it coincides precisely with the moment that the fish bites down on the lure. The timing is perfect and not a matter of judgement or guess. It is well known that when an angler attempts to set a hook he is, most often, either too early or too late. If the former, he succeeds only in jerking the lure prematurely from the mouth of the fish and if the latter the setting movement coincides with the fish's spitting out of the lure.

In accordance with one of the more detailed aspects of the invention, reaction force may be increased by providing, at the front end of the plunger, a head 50, which is abruptly surfaced at its trailing edge and which therefore resists any sudden retrograde movement through the water. The presence of the head 50, in short, is to insure that when the spring 33 is triggered the result will be to suddenly pull the lure body forwardly with respect to the line rather than to pull the line rearwardly with respect to the lure body. Water, as is well known, tends to resist sudden acceleration.

While the construction and operation have been described in connection with the mechanical aspects of the lure it is one of the features that the body may include a decorative shell 60 of a shape, size and coloration considered to be attractive to the fish to be caught. Thus it is one of the features that many different shells may be employed utilizing the same internal body and operating mechanism so that the device may be universally employed for practically all species of fish. Since the outer shell in the present embodiment is mechanically non-functional, it may be provided with relief slots 61 through which the guards 21–23 extend and with respect to which the guards are freely movable; however, the shell may conveniently be considered part of the body.

While the invention has been described in connection with a preferred embodiment using a compression type spring 33, it will be understood by one skilled in the art that a tension spring may be used extending rearwardly from the piston, either instead of, or in addition to, the spring 33 and with suitable precautions being taken so that the point of attachment to the piston does not affect the operation of the latch roller 34.

It will be apparent to one skilled in the art that the device is susceptible to low cost manufacture on a quantity production basis and it will be equally apparent that the device is foolproof in its principle of operation as well as being inherently durable to withstand the effects of many successful catches. The setting of the hook, or hooks, is immediate, precise, and automatic, occurring without any intentional action or exercise of skill on the part of the angler. Also the unit may be clearly distinguished from the mechanism described in the prior patents in which the relative movement of the hook, upon getting a strike, is such as to unset, rather than to set, the hook.

While mention has been made to use of the auxiliary guards 21–23 in the preferred construction, the triggering member 40 may be shaped and positioned to perform a guarding function as well illustrated in FIG. 2, making it possible to employ the invention in simplified form.

What I claim is:

1. A fish lure comprising, in combination, a body, a longitudinally extending plunger reciprocably mounted in the body and having provision for connection to a fishing line at its forward end, a hook on the body having a point in hooking position, a spring interposed between the rear end of the plunger and one end of the body for biasing the body into a forwardly-telescoped position on the plunger, a latch mechanism between the plunger and the body for latching the body in a rearwardly extended position with respect to the plunger accompanied by stressing of the spring, and a latch triggering member movably mounted on the body and so arranged that when a fish bites down on the lure the triggering member is actuated and the latch releases the body, thus freeing the spring to snap the body and hook forwardly on the plunger for setting of the hook in the mouth of the fish.

2. A fish lure as claimed in claim 1 having a plurality of hooks secured to the body and facing in different radial directions and having individual guards therefor, at least one of the guards being coupled for actuation to the latch triggering member.

3. The combination as claimed in claim 1 in which the body of the lure includes an apertured tube in which the plunger reciprocates, a piston at the rear end of the plunger, the latch mechanism including a roller mounted on the latch triggering member and movable into and out of the aperture in the body between a latching position in which the roller is interposed in the path of movement of the piston and a triggered position in which the roller is disengaged from the piston.

4. The combination as claimed in claim 1 in which there is provided, at the forward end of the plunger, a head member so shaped as to present appreciable resistance against retrograde movement through the water thereby to increase the available reaction force to minimize retrograde movement of the line as the body of the lure is snapped forwardly.

5. A fish lure comprising, in combination, a body, a longitudinally extending plunger reciprocably mounted in the body and having provision for connection to a fishing line at its forward end, a hook on the body having a point in hooking position, a guard cantilevered on the body for normally shielding the point to prevent the hook from snagging upon weeds or other obstructions, a spring interposed between the plunger and the body for biasing the two into telescoped relation, a latch mechanism between the plunger and the body for latching the body in a rearwardly extended position with respect to the plunger accompanied by stressing of the spring, and a latch triggering member movably mounted on the body and coupled to the guard so that when a fish bites down on the lure depressing the guard the point of the hook is exposed and the latch mechanism releases the body thus freeing the spring to snap the body and hook forwardly on the plunger for setting of the hook in the mouth of the fish.

6. The combination as claimed in claim 5 in which the body has an outer shell secured thereto and in which the shell has a clearance slot through which the guard and enclosed hook extend with the guard being freely movable in the slot for exposure of the hook and triggering of the latch mechanism.

* * * * *